US012659301B2

(12) United States Patent (10) Patent No.: US 12,659,301 B2
Medvinsky et al. (45) Date of Patent: Jun. 16, 2026

(54) SYSTEM AND METHOD FOR FIELD PROVISIONING OF CREDENTIALS USING QR CODES

(71) Applicant: ARRIS Enterprises LLC, Suwanee, GA (US)

(72) Inventors: Alexander Medvinsky, San Diego, CA (US); Nicol C. P. So, Newtown, PA (US); Tat Keung Chan, San Diego, CA (US); Greg Nakanishi, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 322 days.

(21) Appl. No.: 18/082,130

(22) Filed: Dec. 15, 2022

(65) Prior Publication Data

US 2023/0198968 A1    Jun. 22, 2023

Related U.S. Application Data

(60) Provisional application No. 63/290,355, filed on Dec. 16, 2021.

(51) Int. Cl.
*H04L 29/06*         (2006.01)
*G06K 7/14*          (2006.01)
                     (Continued)

(52) U.S. Cl.
CPC ........ *H04L 63/0435* (2013.01); *G06K 7/1417* (2013.01); *H04L 9/0825* (2013.01);
                     (Continued)

(58) Field of Classification Search
None
See application file for complete search history.

(56) References Cited

U.S. PATENT DOCUMENTS 9,130,928 B2    9/2015  Qiu et al.
11,251,955 B2 *  2/2022  Clancy .................. H04L 9/3213
                     (Continued)

OTHER PUBLICATIONS

Symington Susan et al: "NIST Cybersecurity White Paper (Draft) Trusted Internet of Things (IOT) Device Network—Layer Onboarding and Lifecycle Management", National Institute of Standards and Technology. Sep. 8, 2020, pp. 1-80, XP093032347, Gaithersburg, MD DOI: 10.6028/NIST.CSWP.09082020-draft Retrieved from the Internet: URL: https://nvlpubs.nist.gov/nistpubs/CSWP/NIST.CSWP.09082020-draft.pdf [retrieved on Mar. 16, 2023] p. 1-p. 24.
(Continued)

*Primary Examiner* — Malcolm Cribbs
*Assistant Examiner* — Hassan A Hussein
(74) *Attorney, Agent, or Firm* — Chernoff, Vilhauer, McClung & Stenzel, LLP

(57)                ABSTRACT

A system and method for authenticating a user device is disclosed. In one embodiment, the method comprises: transmitting a request for credentials from the user device, wherein the request comprises a user device identifier and the credentials comprise an asymmetric key pair having a public key and an associated private key, the private key being encrypted; receiving the credentials in the user device, the credentials comprising the encrypted private key and the public key; retrieving quick response (QR) code data associated with the user device identifier from a QR code data directory, the QR code data generated from the public key and stored in the QR code data directory according to the user device identifier by a secure online service; extracting the public key from the QR code data; and establishing an authenticated and encrypted communication session with the user device according to the extracted public key.

17 Claims, 11 Drawing Sheets

(51) Int. Cl.

| | |
|---|---|
| *H04L 9/08* | (2006.01) |
| *H04L 9/14* | (2006.01) |
| *H04L 9/30* | (2006.01) |
| *H04L 9/32* | (2006.01) |
| *H04L 9/40* | (2022.01) |

(52) U.S. Cl.
CPC .............. *H04L 9/14* (2013.01); *H04L 9/3073* (2013.01); *H04L 9/3226* (2013.01)

(56) References Cited

U.S. PATENT DOCUMENTS

| | | | | |
|---|---|---|---|---|
| 2013/0232336 | A1* | 9/2013 | Cheung | H04L 9/006 |
| | | | | 713/155 |
| 2016/0147979 | A1* | 5/2016 | Kato | G06F 21/6209 |
| | | | | 713/171 |
| 2017/0193543 | A1* | 7/2017 | Priebatsch | G06Q 20/202 |
| 2017/0257819 | A1* | 9/2017 | McCann | H04L 67/56 |
| 2018/0109418 | A1* | 4/2018 | Cammarota | H04W 12/50 |
| 2018/0183666 | A1* | 6/2018 | Likar | H04L 41/0809 |
| 2018/0225444 | A1* | 8/2018 | Frenz | G06F 21/44 |
| 2018/0308086 | A1* | 10/2018 | Shan | G06Q 20/32 |
| 2019/0156167 | A1* | 5/2019 | Singh | G06Q 20/367 |
| 2019/0303071 | A1* | 10/2019 | Tsuji | H04W 76/15 |
| 2019/0305964 | A1* | 10/2019 | Hamel | H04L 9/0891 |
| 2019/0327311 | A1* | 10/2019 | Khassanov | H04L 67/02 |
| 2019/0356482 | A1* | 11/2019 | Nix | H04W 12/041 |
| 2020/0274699 | A1* | 8/2020 | Watson | H04L 9/14 |
| 2020/0274868 | A1* | 8/2020 | Passaglia | H04L 63/083 |
| 2021/0111906 | A1* | 4/2021 | Kang | H04L 9/0861 |
| 2021/0306161 | A1* | 9/2021 | Medvinsky | E02B 3/122 |
| 2021/0365914 | A1* | 11/2021 | Oe | G06Q 20/401 |

OTHER PUBLICATIONS

Wi-Fi Alliance: "Wi-Fi Easy Connect; Specification Versions 2.0", Dec. 14, 2020, pp. 1-266, XP055768216, Retrieved from the Internet: URL: https://www.wi-fi.org/download.php?file=/sites/default/files/private/Wi-Fi_Easy_Connect_Speccification_v2.0.pdf [retrieved on Jan. 25, 2021] p. 1-p. 40.

International Search Report and Written Opinion RE: Application No. PCT/US22/053018, dated Mar. 28, 2023.

* cited by examiner

Figure 6A:
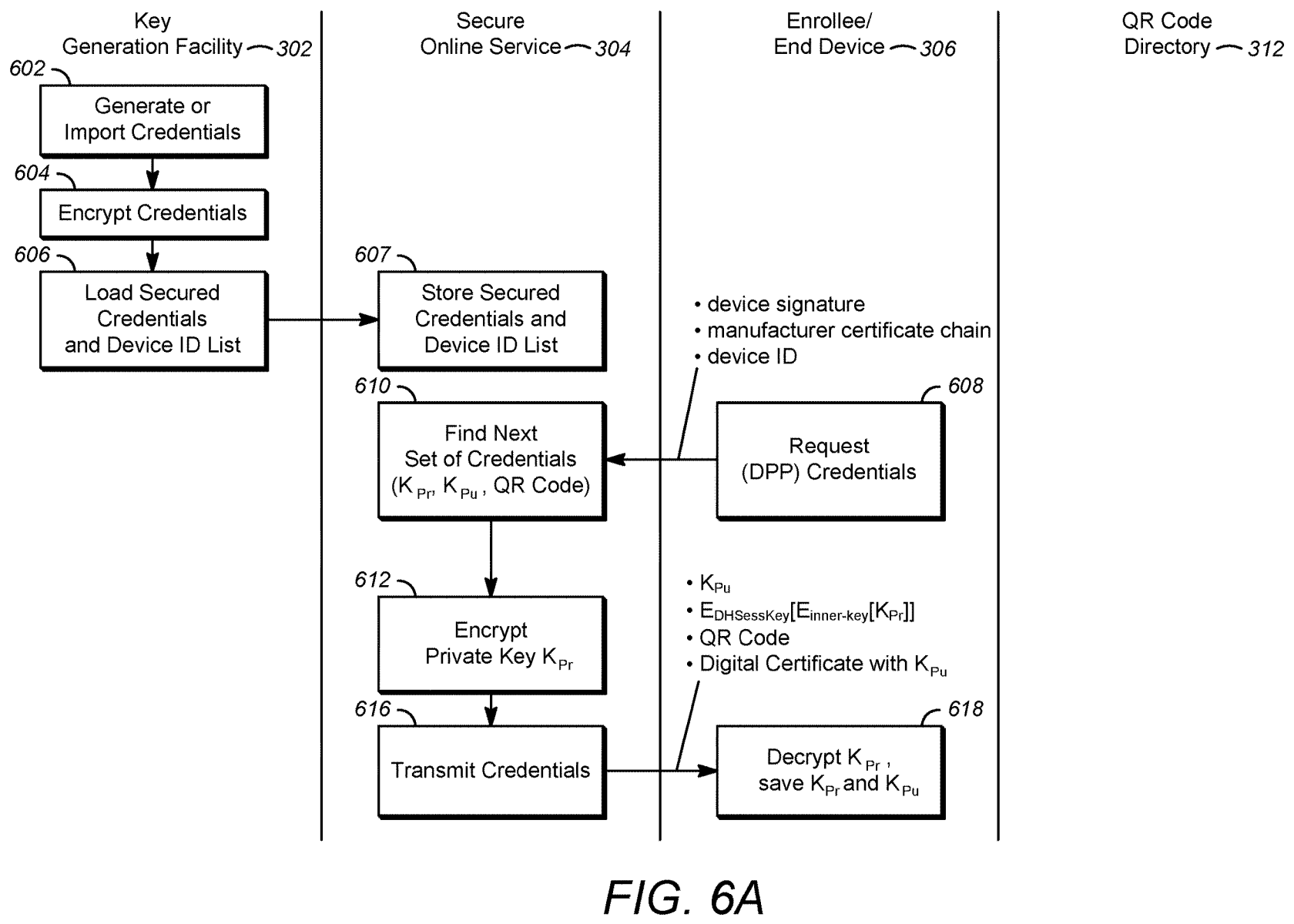

QR Code
Directory — 312

Enrollee/
End Device — 306

- device signature
- manufacturer certificate chain
- device ID

Request
(DPP) Credentials

608

- $K_{Pu}$
- $E_{DHSessKey}[E_{inner-key}[K_{Pr}]]$
- QR Code
- Digital Certificate with $K_{Pu}$ Decrypt $K_{Pr}$,
save $K_{Pr}$ and $K_{Pu}$

618

Secure
Online Service — 304

Store Secured
Credentials and
Device ID List

607

Find Next
Set of Credentials
($K_{Pr}$, $K_{Pu}$, QR Code)

610

Encrypt
Private Key $K_{Pr}$

612

Transmit Credentials

616

Key
Generation Facility — 302

Generate or
Import Credentials

602

Encrypt Credentials

604

Load Secured
Credentials
and Device ID List

SYSTEM AND METHOD FOR FIELD PROVISIONING OF CREDENTIALS USING QR CODES

CROSS-REFERENCE TO RELATED APPLICATIONS

The present application claims priority to U.S. Provisional App. No. 63/290,355 filed Dec. 16, 2021, the content of which is incorporated herein by reference in its entirety.

BACKGROUND

1. Field

The present disclosure relates to systems and methods for securely configuring devices to operate on Wi-Fi networks, and in particular to a system and method for field provisioning of credentials for such configuration.

2. Description of the Related Art

Protocols have been defined that provide a simple and secure method to onboard device or join Wi-Fi networks without knowing or entering a password. One such protocol is "Wi-Fi Easy Connect," which is also known as the Device Provisioning Protocol (DPP). The details of DPP can be found in "Device Provisioning Protocol Specification Version 1.1, by the Wi-Fi Alliance, 2018, which is hereby incorporated by reference herein. Bootstrapping and authentication is configured using a uniform resource identifier (URI) and public key corresponding to the DPP credentials, which is acquired by scanning a Quick Response (QR) code using a camera or other photo-equipped device. Normally that QR code is printed on a label, but it is challenging to provide the same QR code when DPP credentials are provided over-the-air to an already deployed device for which a label cannot be printed.

SUMMARY

To address the requirements described above, this document discloses a system and method for authenticating a user device. In one embodiment, the method comprises: transmitting a request for credentials from the user device, wherein the request comprises a user device identifier and the credentials comprise an asymmetric key pair having a public key and an associated private key, the private key being encrypted; receiving the credentials in the user device, the credentials comprising the encrypted private key and the public key; retrieving quick response (QR) code data associated with the user device identifier from a QR code data directory, the QR code data generated from the public key and stored in the QR code data directory according to the user device identifier by a secure online service; extracting the public key from the QR code data; and establishing an authenticated and encrypted communication session with the user device according to the extracted public key.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIGS. 6A and 6B are diagrams illustrating an exemplary operations used to provide credentials to the user device in a further embodiment in which the user requests a QR code from the wireless device using an earlier-provisioned trusted certificate;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Background

DPP provides improved confidentiality and resistance to man-in-the middle attacks for Wi-Fi networks. With DPP, elliptic Curve cryptography is utilized to securely establish session keys between a wireless client device or station (STA) and an access point (AP). The first step is to authenticate the Elliptic Curve Diffie Hellman (ECDH) public key of the other party. The DPP specification describes multiple methods how to establish trust in the ECDH public key. One such method uses a middleman device called Configurator that verifies public keys of both STA and AP by scanning their QR code.

The configurator initiates authentication sequence after scanning QR code on the responder (which may be the STA or the AP). The configurator trusts STA or AP because its bootstrap public key was scanned from the QR code on the responder. The STA or AP trusts configurator because it knows its bootstrap public key. However, if a man-in-the middle attacker knew STA or AP bootstrap public key, it could impersonate a valid configurator.

Figure 1:
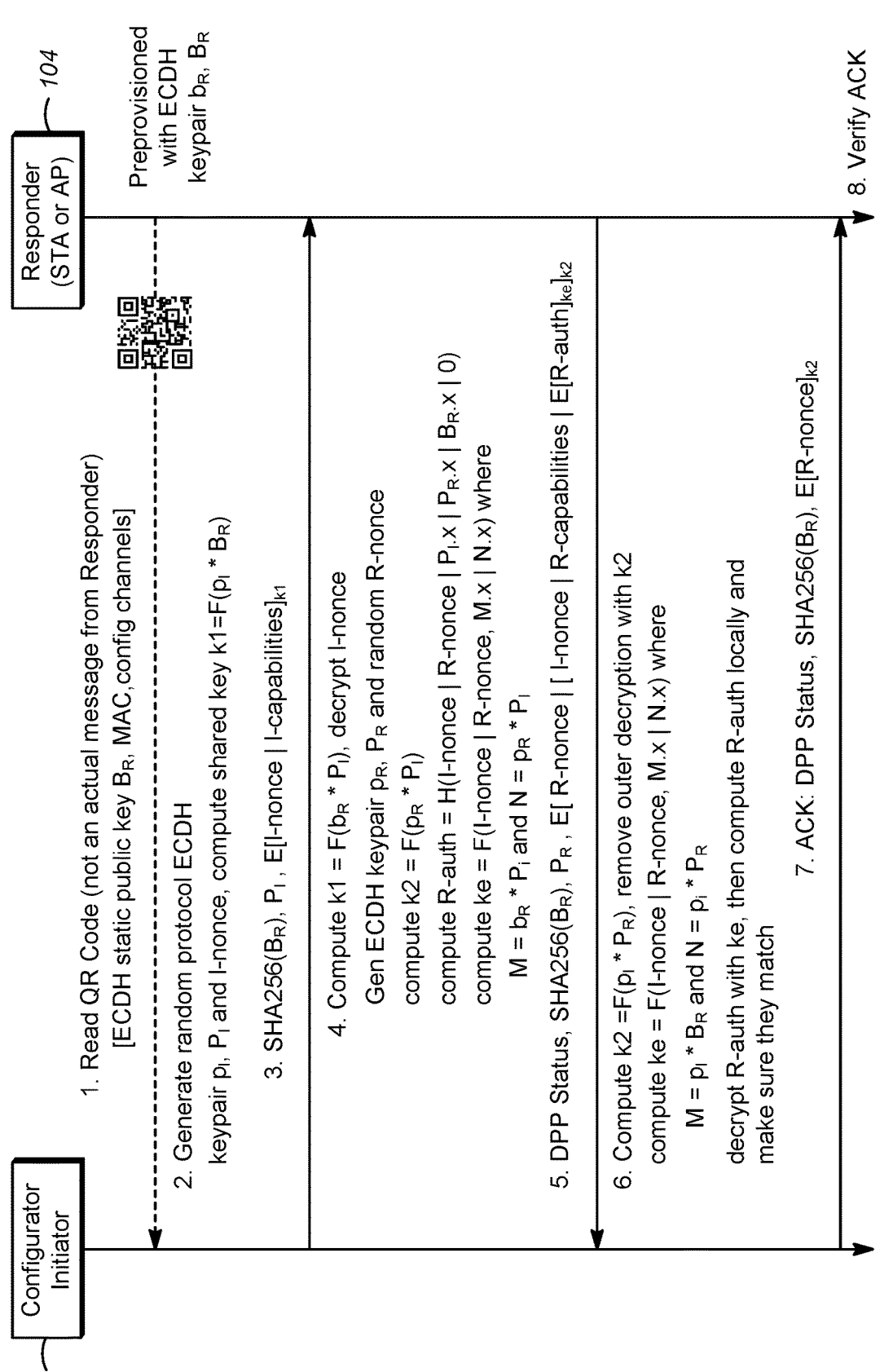
FIG. 1 is a diagram illustrating the authentication sequence.

FIG. 1 is a diagram illustrating the authentication sequence. A configurator 102 application (described further in FIG. 3 and the text appurtenant thereto) acts as an initiator in the DPP protocol. In step 1, the configurator 102 scans the QR code of the responder device 104 that is normally found on a pre-printed label affixed to the device at manufacture time. The responder 104 is typically an AP (access point) or STA (station)—a wireless device which would like to connect to the local Wi-Fi network via an AP. One example of a responder 104 is the user device 306 described below. Both AP and STA are required to go through the provisioning sequence with a Configurator 102 depicted in FIG. 1. The configurator 102 extracts responder's ECDH public key $B_R$ from the QR code and utilizes it for this provisioning sequence. Note that below we also refer to the public key $B_R$ as $K_{Pu}$ and to the corresponding private key $b_R$ as $K_{Pr}$.

In step 2, the configurator 102 generates a new random ECDH private-public keypair which we call here $p_I$ and $P_I$ respectively, random nonce I-nonce and computes key k1 which will be shared with the responder according to:

$$k1 = F(p_I * B_R)$$

where the symbol '*' represents Elliptic Curve scalar by point multiplication which is well-known in the art of cryptography. The function F( ) is a key derivation function which is provided in the DPP specification.

In step 3, the configurator 102 then sends a message with its public key $P_I$ to the responder along with other attributes depicted in the figure.

In step 4, the responder 104 can compute the same shared key k1 according to:

$$k1 = F(P_I * b_R)$$

The responder 104 then proceeds generating another new ECDH private-public keypair which we call here $p_R$ and $P_R$ respectively, random nonce R-nonce and then computes:

Another shared key $k2 = F(p_R * P_I)$

Authenticating value R-auth$=H(\text{I-nonce}|\text{R-nonce}|P_I \cdot x|P_R \cdot x|B_R \cdot x|0)$ Where '|' denotes concatenation and the notation "·x" is the x-value of the elliptic curve points $P_I$, $P_R$ and $B_R$ and H( ) is a one-way hash function.

The responder 104 also computes an encryption key ke$=F(\text{I-nonce}|\text{R-nonce}|M \cdot x|N \cdot x)$ where M and N are both elliptic curve points computed as follows:

$$M = b_R * P_I$$

$$N = p_R * P_I$$

In step 5, the responder 104 sends a message back to the Configurator which includes the newly-generated elliptic curve public key $P_R$ along with the authenticator R-auth which is twice encrypted—first with ke and then the $2^{nd}$ time with k2.

In step 6, the configurator 102 decrypts and validates the R-auth value and after that trusts the responder as follows:

Compute $k2 = F(p_I * P_R)$ and remove outer-layer encryption of R-auth

Compute $M = p_I * B_R$

Compute $N = p_I * P_R$

Compute ke same as above and then remove inner-layer encryption of R-auth.

After this step, clear R-auth value has been extracted by the configurator 102 from received message. The configurator 102 then makes its own calculation of R-auth as described above and if it matches the received R-auth value, it trusts the responder 104.

In step 7, the configurator 102 sends back the R-nonce value encrypted with k2 as an acknowledgement message back to the responder 104.

In step 8, the responder 104 decrypts R-nonce with k2 and if it matches its copy of R-nonce that was generated in a previous step, then it trusts the configurator 102.

After the authentication sequence, both the configurator 102 and STA or AP 104 trust each other's Elliptic Curve Diffie-Hellman (ECDH) protocol public key. The configurator 102 signs and returns STA or AP random protocol public key $P_R$, and generates a Configuration Object that includes the $P_R$.

Figure 2:
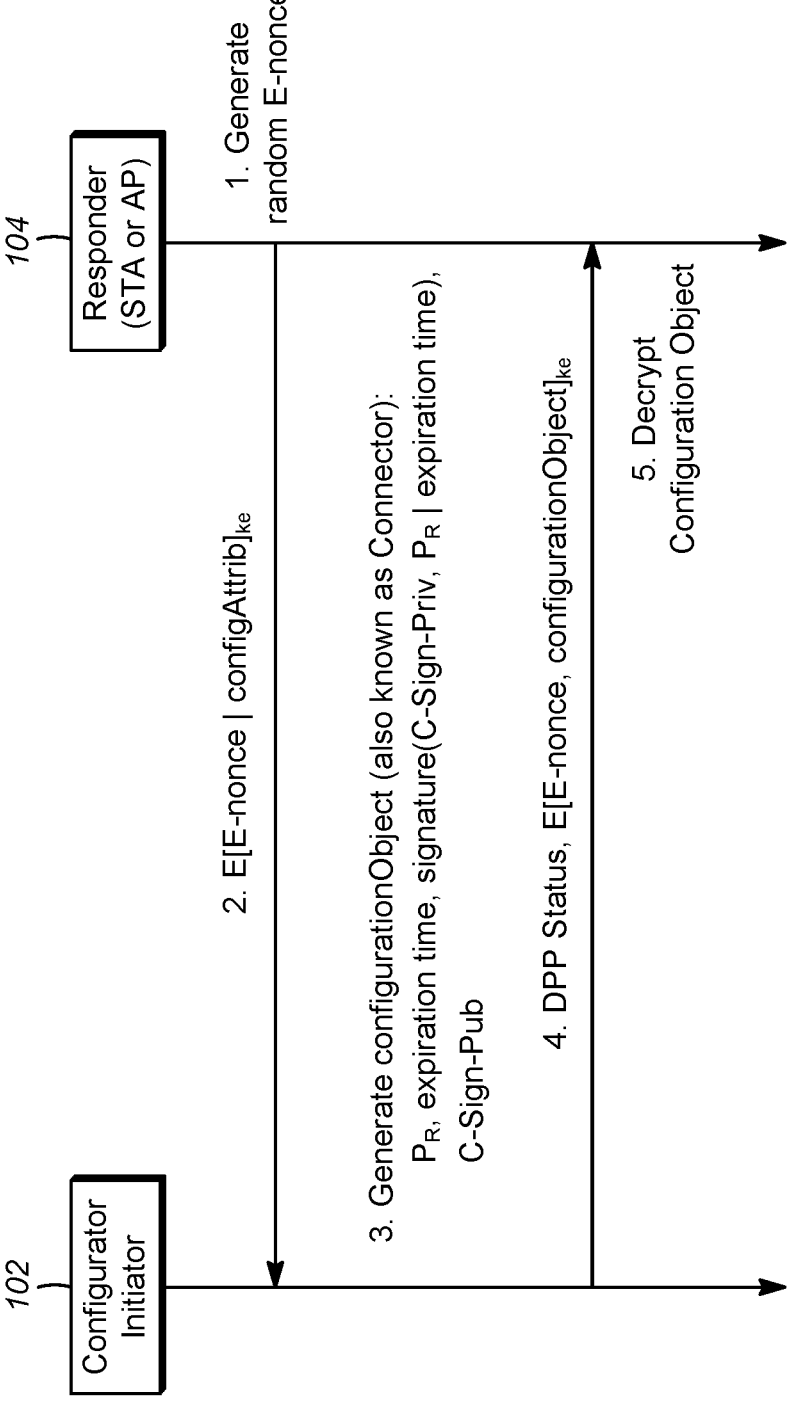
FIG. 2 is a diagram illustrating the signing and return of a Configuration Object.

FIG. 2 is a diagram illustrating the signing and return of the Configuration Object.

In step 1, the responder 104 generates a new random nonce value called E-nonce. Then in step 2, the responder 104 encrypts E-nonce with a previously computed shared key ke and sends it to the configurator 102 as part of the request message for obtaining a Configuration Object. In step 3, the configurator 102 creates the Configuration Object also known as Connector. This object includes responder's randomly generated public key $P_R$ which is digitally signed along with the expiration time of $P_R$. Once $P_R$ expires, the responder 104 needs to obtain a new Configuration Object. The signature can later be validated by a known public key by other communicating devices in the Wi-Fi network, thus created trust in the public key $P_R$.

In step 4, Configuration Object is encrypted with ke and sent back to the responder 104. In step 5, the responder 104 decrypts and locally stores the Configuration Object for future establishment of secure communication with an STA or AP.

The Configuration Object is analogous to a digital certificate in that it is an authenticated credential of the STA or AP. The signed public key of configurator 102 is trusted because it was in proximity and scanned the responder's QR code. Later, STA and AP can establish a secure session with these Configuration Objects—as long as they are signed by same signing key. An analogous sequence is performed for both STAs and APs that desire to establish a secure session between one another. At the conclusion of the sequence, both the STA and AP have their own Configuration Object.

One difficulty with this authentication procedure is that DPP is a relatively new protocol and most wireless devices were already manufactured without DPP support. Thus, an AP or STA may have already been manufactured and distributed to consumers without DPP credentials, a bootstrap keypair, or QR code.

Systems for online provisioning of secure device credentials exist, but such systems do not provision QR codes associated with the credentials. Some wireless devices (e.g. mobile phones, tablets, or laptops) can simply receive its QR code with the rest of DPP credentials and show a QR code on its display. But some Wi-Fi enabled devices (such as refrigerators or toasters) do not have such a display, and many have already been manufactured and fielded without the QR code labels.

There is a need to provision DPP credentials to such fielded devices that do not include a display, and to make the QR Code associated with those credentials accessible to the user on some other device owned by that same user, for example, a mobile phone, tablet, laptop, or personal computer. Described below is a system and method for field provisioning DPP credentials such that the user is able to receive the associated QR code to complete the authentication procedures.

Overview

This is accomplished by a secure online service publishing the QR Code along with a device identifier in a secure directory where it can later be retrieved and presented for scanning. The interface between the secure online service and the directory is encrypted (e.g. using Secure Sockets Layer (SSL), Transport Layer Security (TLS), or a virtual private network (VPN)) to assure that the QR code is not compromised during such transmission. The device identifier is later used to retrieve the QR code from the directory. Access to the directory is restricted to authorized clients, for example, by restricting access to a user registration portal.

System Description

Figure 3:
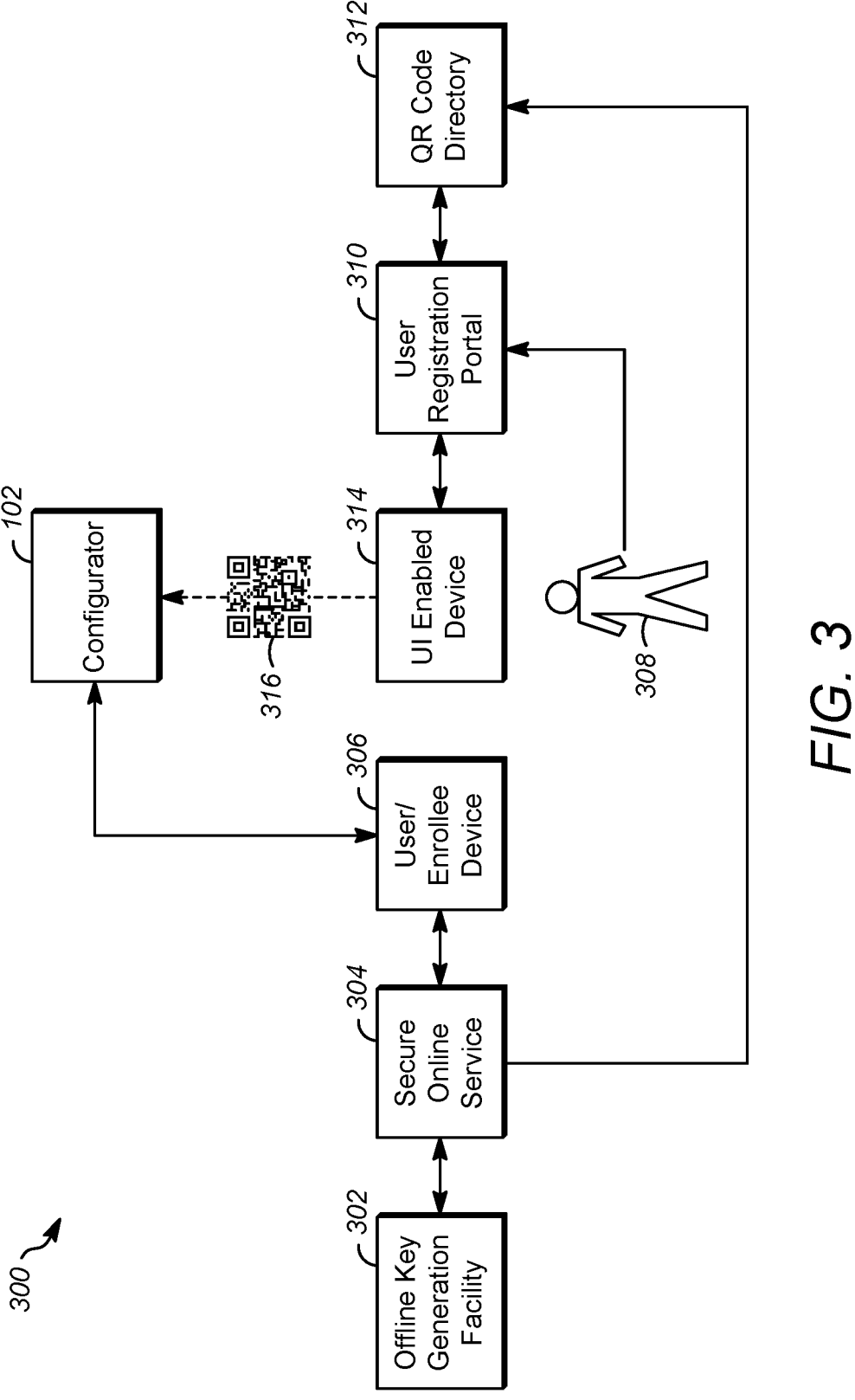
FIG. 3 is a diagram of one embodiment of a credential provisioning system.

FIG. 3 is a diagram of one embodiment of a credential provisioning system 300. The credential provisioning system 300 comprises a key generation facility 302 communicatively coupled to a secure online service 304 such as a key provisioning server. The secure online service 304 generates personalization data which is provided to the secure online service 304 upon request. The secure online service 304 generates QR code data from the personalization data and transmits the personalization data to a communicatively coupled enrollee device 306 (the device sought to be authenticated for use, and hereinafter alternatively be referred to as the user device 306). The secure online service 304 also transmits the QR code data along with user device identifying information (ID) to a communicatively coupled QR code directory 312. The user 308 communicates with a user registration portal 310 to register the product, and the QR code directory 312 provides QR code data to the UI enabled device 314, which generates a visual depiction of the QR code 316 using the QR code data and displays the generated QR code 316. The QR code 316 is then scanned by a configurator 102, which proceeds to authenticate the user device 306.

Figure 4:
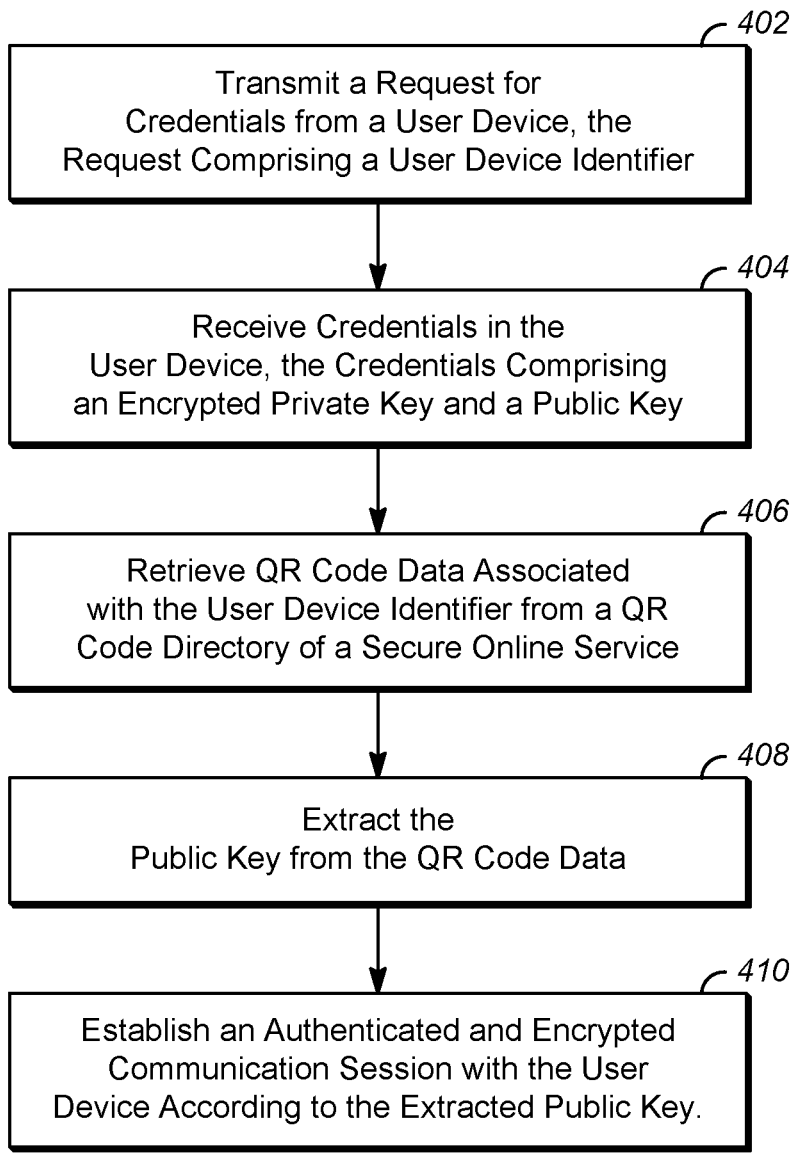
FIG. 4 is a diagram illustrating an overview of exemplary operations that can be used to provide credentials to a user device for purposes of authorizing the user device.

FIG. 4 is a diagram illustrating an overview of exemplary operations that can be used to provide credentials to a user device 306 for purposes of authorizing the user device 306. The process begins with the key generation facility 302 (preferably a secure offline system) generating a plurality credentials. Each credential comprises an asymmetric key pair, having a public key and associated private key. The key generation facility 302 then encrypts the private key of each symmetric key pair. In one embodiment, the private key is encrypted according to an inner key that is pre-provisioned to the user device 306. The inner key may be global (e.g. shared by all user devices 306), may be shared by multiple devices (e.g. all user devices 306 of a particular model), or may be unique to each user device.

The key generation facility 302 then provides the public key and the encrypted private key to the secure online service 304 for storage therein, along with a user device identifier (ID) associated with the public key and encrypted private key and inaccessible to prohibited users. The public key, encrypted private key, and associated user device ID may be pushed to the secure online service 304 (e.g. provide when determined by the key generation facility 302) or pulled to the secure online service 304 (e.g. provided upon a request for the personalization data). The graphical representation of the QR Code (e.g., a JPEG image) may optionally be generated in the key generation facility 302 and provided to the secure online service 304 along with the rest of the personalization data.

In block 402, a request for credentials is transmitted from the user device 306 to the secure online service 304. The request comprises the user device ID. The secure online service 304 fetches the public key and encrypted private key associated with the user device ID of the request, and sends a message to the user device 306 having the requested public key and encrypted private key.

As shown in block 404, the user device 306 receives the message having the requested credentials from the secure online service 304. The user device 306 decrypts the message (if encrypted) using the DH session key and decrypts the encrypted private key. The private and public keys are then stored for later use for in in authenticating the user device 306.

The secure online service 304 also generates QR code data from the public key (if not already generated in the key generation facility 302 as described above), and provides that QR code data along with the user device identifier associated with the QR code data (such as the serial number of the user device 306) to the QR code directory 312 for storage. The QR code directory 312 later uses that user device identifier to retrieve and provide the associated QR code data to a designated device upon request.

In block 406, QR code data associated with the user device identifier is retrieved from the QR code directory 312, and in block 408, the public key is extracted from the QR code data. Finally, in block 410, an authenticated and encrypted communication session is established with the user device 306 according to the extracted public key.

Figure 5A:
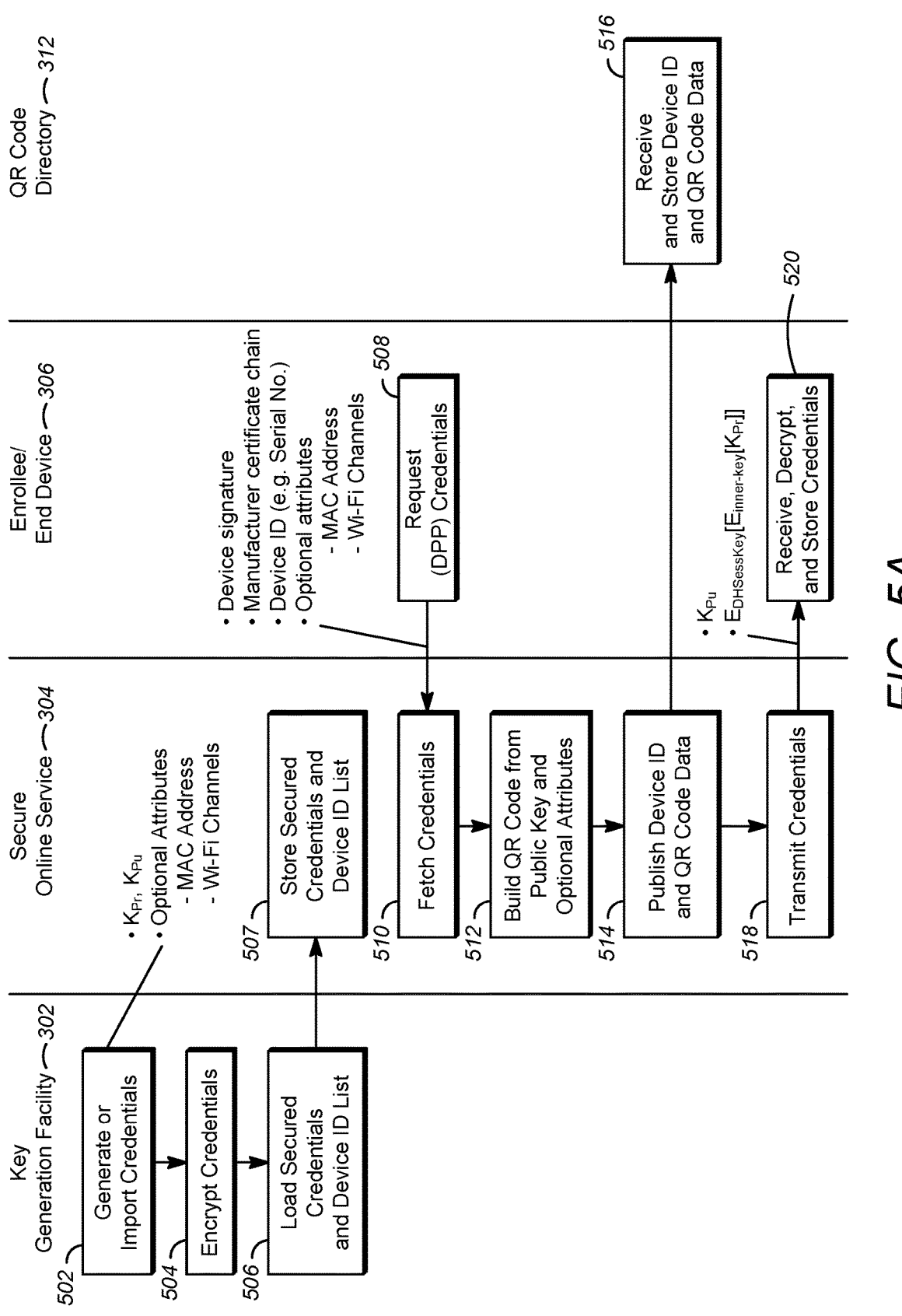
FIGS. 5A-5D are diagrams providing further details regarding the operations described in FIG. 4.
Figure 5B:
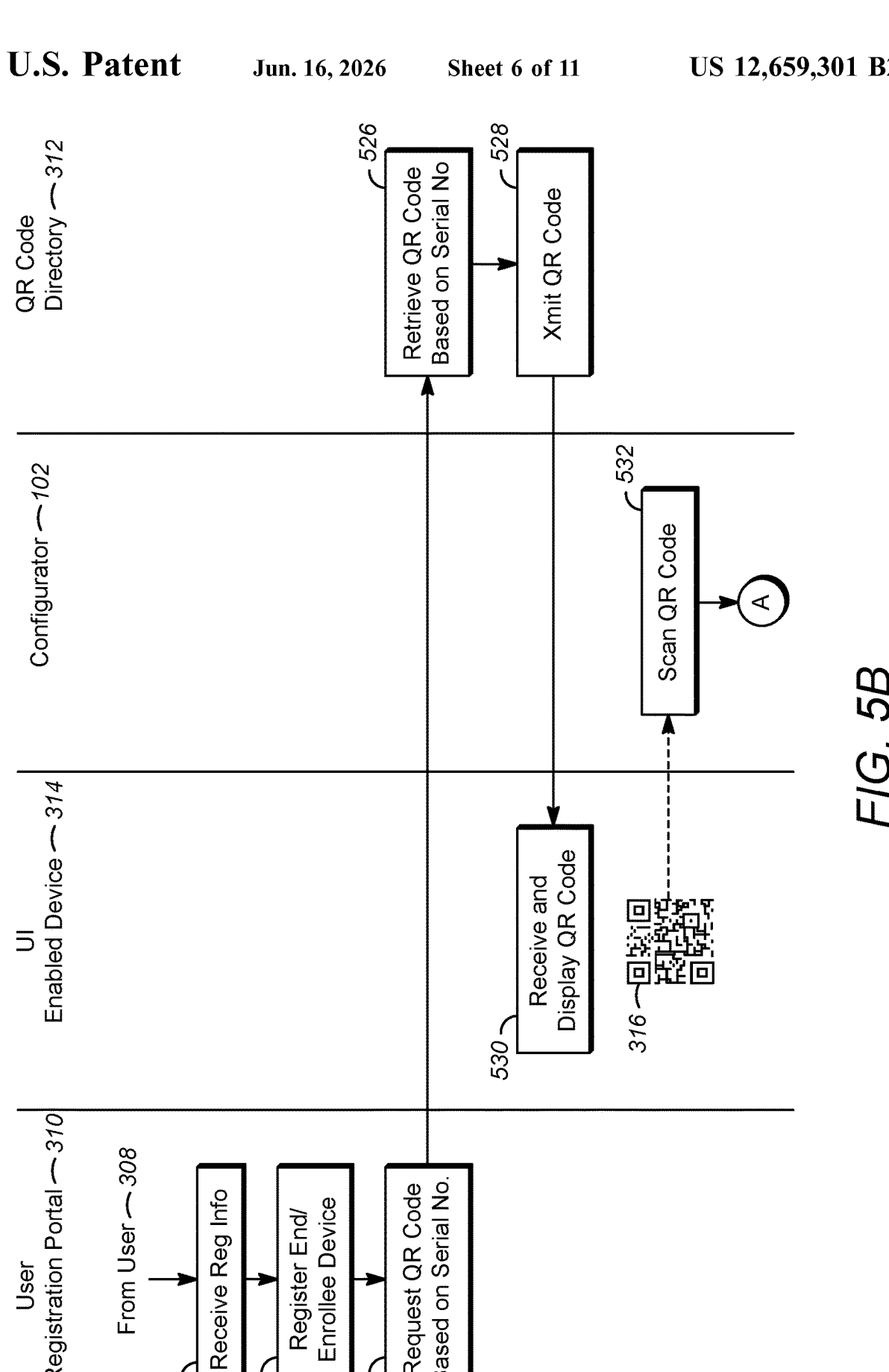

FIGS. 5A and 5B are diagrams providing further details regarding the operations described in FIG. 4. In block 502, the key generation facility 302 generates or imports a plurality of sets of credentials. Each set of credentials includes, for example, a public/private key pair (e.g. $K_{Pr}$ and associated $K_{Pu}$) and optional attributes that identify end devices 306. Such optional attributes include the media access control (MAC) address of the user devices 306 or the Wi-Fi channels used by the associated user devices 306. In block 504, the key generation facility 302 encrypts the private key of each set of credentials, for example, using an inner-key that may be pre-provisioned to the user device 306 for which the credentials are intended. Each set of credentials (with the associated encrypted private key) is provided to the secure online service 304 for storage, along with a list of device IDs (e.g., serial numbers) for which the each set of personalization data is intended to be provisioned, as shown in block 506. Typically, these operations are performed temporally in advance of a request for such personalization data, but may instead be performed in response to such request. The secured credentials are then stored, as shown in block 507.

The user device 306 sends a request for credentials to the secure online service 304, as shown in block 508. Since the user device 306 has not yet been provisioned with DPP credentials (e.g., a signed configuration object), the user device 306 may use a mobile operator network instead of Wi-Fi to obtain the credentials from the secure online service 304, or establish a temporary Wi-Fi connection using a legacy password-based authentication method. The request includes the device ID and may include the device signature, device certificate chain from the device manufacturer utilized to validate that the request came from a legitimate user device 306 authorized to make the request, and optional parameters such as a media access control (MAC) address of the requesting user device 306 and/or Wi-Fi channels used by the requesting user device 306, if such optional parameters were not provided to the key generation facility 302 and used to generate the personalization data (as described above). The fetched credentials are those specific to the MAC address if one was supplied as an optional attribute with the request. Otherwise, the next available credential set is selected. In one embodiment, the online service 304 has been pre-provisioned with an authorized user device ID list. In this embodiment, the secure online service 304 verifies that the user device ID received from the user device 306 is one of the pre-provisioned authorized device IDs, and only responds to the request if the user device ID is on that list, otherwise rejecting the request. This authorized device ID list can be pre-provisioned by the key generation facility 302 as shown in block 506 or pre-provisioned to the secure online service 304 in some other manner.

As shown in block 510, the secure online service 304 then fetches the previously stored credentials (public key and encrypted private key and optional data, if any). The secure online service 304 generates QR code data from the public key and builds a QR code from the public key (and the optional attributes, if available), as shown in block 512. This same step could have been performed earlier in the key generation facility 302 and in that case, the online service 304 simply retrieves the QR code data from its local storage along with the public and private keys. That QR code data is then provided (preferably over a secure communications channel) to the QR code directory 312 along with the associated user device 306 ID for storage in the QR code directory 312. This is illustrated in block 514. The QR code directory 312 then stores the QR code data associatively with the user device 306 serial number, as shown in block 516. Access to the QR code directory 312 is restricted to authorized clients (for example, via the user registration portal 310 illustrated in FIG. 5B. The QR code data may optionally include additional information such as the MAC address and/or channel information of the user device 306. Such information may be obtained, for example, by the user device 306 optionally transmitting the MAC address and Wi-Fi channel information in block 508, or by including MAC address and/or Wi-Fi channels in the credentials that are generated or imported in block 502. In such cases, the QR code is generated from the public key $K_{Pu}$ and the optional additional information.

As shown in block 518, the secure online service 304 also transmits the credential set, including the public key and encrypted private key (and any optional data), to the user device 306. As described above, the private key is encrypted, for example, according to the inner-key of the user device 306. In optional embodiments, the credential set may be further encrypted. This can be accomplished, for example, by the secure online service 304 generating a client key agreement public key (CKAPK) and a corresponding client key agreement private key (CKAPrK). Similarly, the user device 306 generates secure online service key agreement public key (SoSKAPK) and corresponding user device key agreement private key (SoSKAPrK). The user device 306 transmits the CKAPK to the secure online service 304 as a part of the credential request message. The secure online service 304 receives the client key agreement public key CKAPK, and derives a key agreement encryption key (KAEK) from the client key agreement public key CKAPK and the secure online service key agreement private key SoSKAPrK. This can be accomplished using a variety of methods including:

Diffie-Hellman KAEK=Derive(CKAPK$^{SoSPAPrK}$ mod
   $p$) and

Elliptic Curve DH KAEK=Derive
   (SoSKAPrK*CKAPK)

where '*' denotes a special elliptic curve multiply operation that is well-known to those skilled in cryptography, and p denotes a prime number. The secure online service 304 then further encrypts the encrypted credentials with the KAEK, and transmits the resulting encrypted credentials to the user device 306. So, for example, the transmitted credential set may be of the form:

$K_{Pu}, E_{inner-key}[K_{Pr}]$ or $K_{Pu}, E_{KAEK}[E_{inner-key}[K_{Pr}]]$

The user device 306 receives the credential set, and if encrypted, uses the secure online service key agreement public key CAKAPK and the user device's client key agreement private key CKAPrK to generate the key agreement encryption key KAEK. Then, the user device 306 decrypts the further encrypted credentials using KAEK to generate the encrypted credentials. The encrypted credentials are then decrypted using the inner key. The private key and public key are stored for future use in the authentication procedure described below. In one embodiment the public key $K_{Pu}$ is also encrypted using the KAEK before transmission, and decrypted by the user device 306 using KAEK. This is because the public key $K_{Pu}$ may later be used to establish trusted communications.

The user 308 becomes aware that its user device 306 has completed the DPP credentials provisioning sequence and creates an account with the manufacturer and registers the user device 306 via a user registration portal 310 by providing registration information to the user registration portal, as shown in block 520. Such registration information includes contact information for the UI enabled device 314 (e.g. the cellphone number or email address of the UI enabled device 314 to be used to display the QR code 316) and the identifier (e.g. serial number) of the user device 306 to the user registration portal 310. The user registration portal 310 typically complies with legal privacy requirements and makes confidentiality terms available to the user 308. Registration is accomplished via a secure communication path such as HTTPS (which is encrypted according to TLS).

The user registration portal receives the registration information, and registers the user device 306, as shown in blocks 520 and 522. The user registration portal 310 transmits a request for the QR code of the user device 306, as shown in block 524. The request comprises the serial number of the user device 306. Based on the serial number of the user device 306, the QR code directory 312 retrieves the QR code data associated with that user device 306 and transmits that QR code data to the UI enabled device 314 at the provided contact information (e.g. email address or text), as shown in blocks 526 and 528. In block 530, the UI enabled device 314 receives and displays the QR code 316. In block 532, the configurator 102 scans the QR code 316. In blocks 540 and 542, the configurator 102 and user device 306 performs the DPP authentication protocol with the user device 306 such as the one specified in Wi-Fi Easy Connect Specification, Version 2.0, Wi-Fi Alliance, 2020, which is hereby incorporated by reference herein, using the scanned QR code 316. The result of this protocol is that the user device 306 generates a new public/private keypair $K_{Qu}$, $K_{Qr}$ and the new public key $K_{Qu}$ is inside a configuration object that is signed by the configurator 102.

Figure 5C:
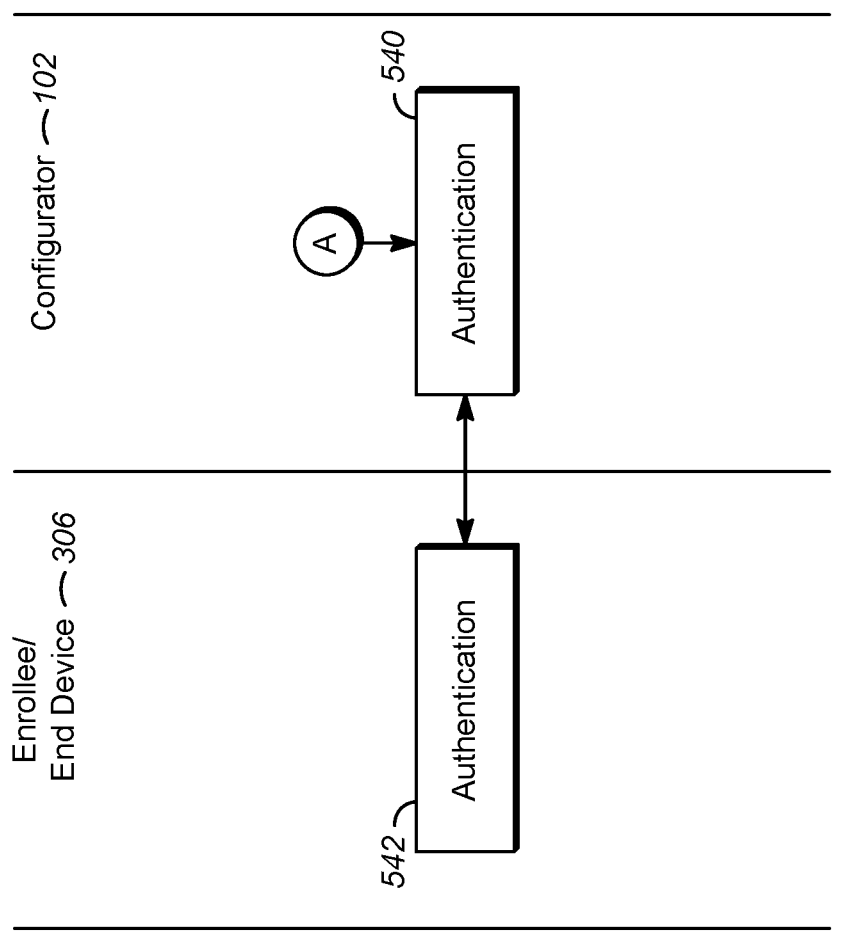
Figure 5D:
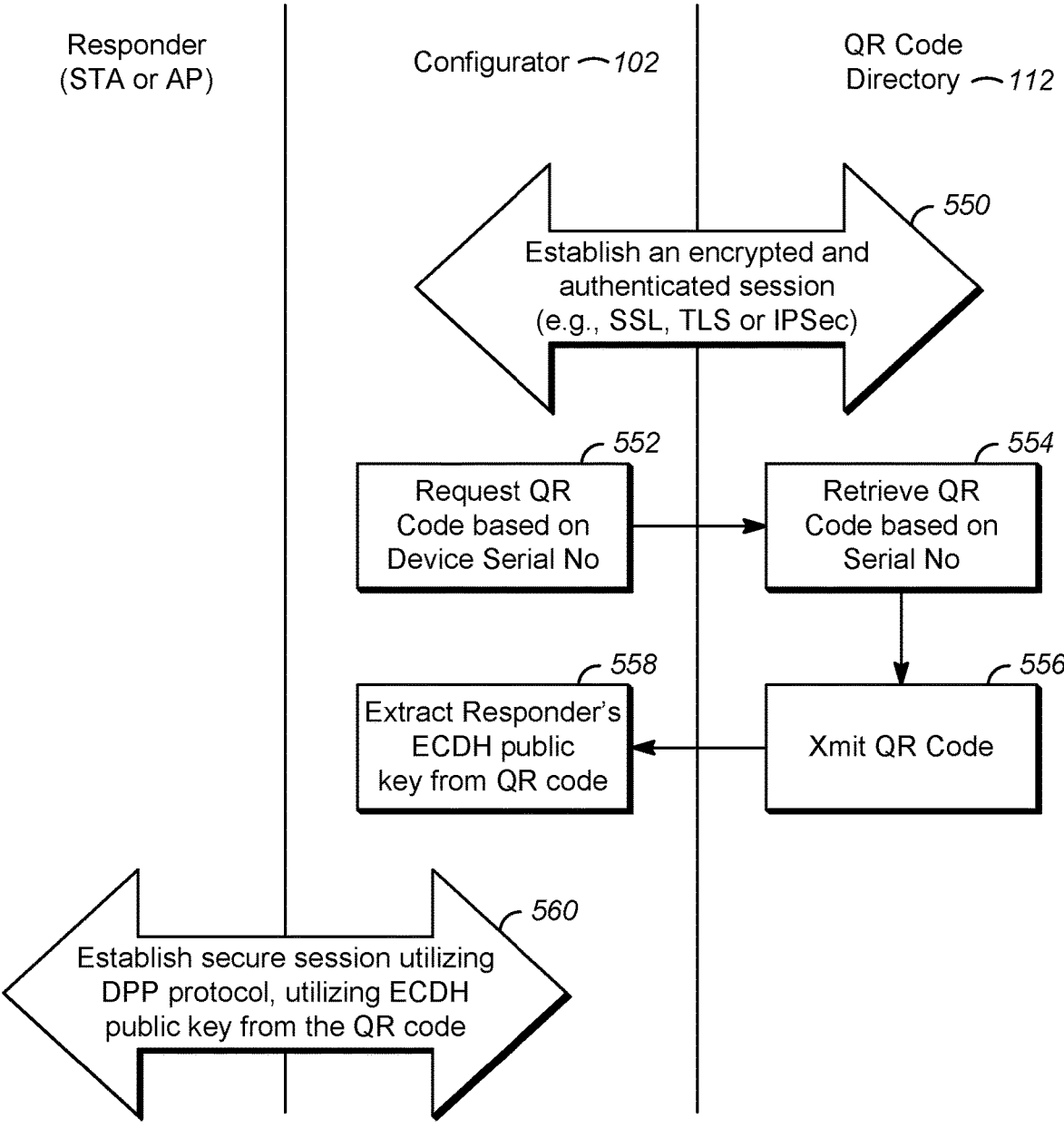

FIG. 5D is a diagram presenting another embodiment of exemplary operations that can be used to provide credentials to a user device 306 for purposes of authorizing the user device 306. This embodiment differs from the previous solutions in that the user registration portal 310 is not used by the user 308 to obtain the QR code, and thus, the operations shown in FIGS. 5B and 5C are not necessary. Instead, the configurator (which may be implemented as an application executing on a mobile device such as a smartphone) uses it's credentials to authenticate to the QR code directory 112 to establish a secure connection and use that secure connection to retrieve the QR code data without the user's involvement. First, the configurator 102 establishes a secure session with the QR code directory 312, as shown in 550. This secure session may be established by any appropriate protocol, including, for example, SSL, TLS, or Internet Protocol Security (IPSec). The configurator 102 provides a user interface where a user can enter a serial number of the user device 306 (obtained, for example from a label on the device, with the electronic version of the serial number kept confidential). Once entered, the configurator 102 then submits a query or request having the serial number of the user device 306, to the QR code directory to request the QR code, as shown in block 552. The QR code directory 312 accepts the request. If the QR code directory 312 verifies that configurator 102 is authorized for such a query, the QR code directory 112 retrieves the QR code based on the serial number, and transmits the QR code data (public key of the device $K_{Pu}$, and optional MAC Address and Wi-Fi channels) to the configurator 102, as shown in blocks 554 and 556. The configurator 102 then extracts the responder's ECDH public key from the QR code, as shown in block 558. The responder and the configurator 102 then establish a secure session using the DPP protocol, using the ECDH public key from the QR code, as shown in 560. While it is important for a potential attacker to not have access to the database of user device serial numbers, this essentially relieves the user device 306 from needing a QR code 316 pre-printed or otherwise available to the user device 306 when it is initially fielded to the user 308.

In an alternative embodiment, instead of establishing a secure session the configurator 102 may directly sign its request for the QR code transmitted to the QR code directory 312, and attach the configurator's certificate chain. The QR code directory 312 can then validate the configurator 102 using these credentials.

Figure 6B:
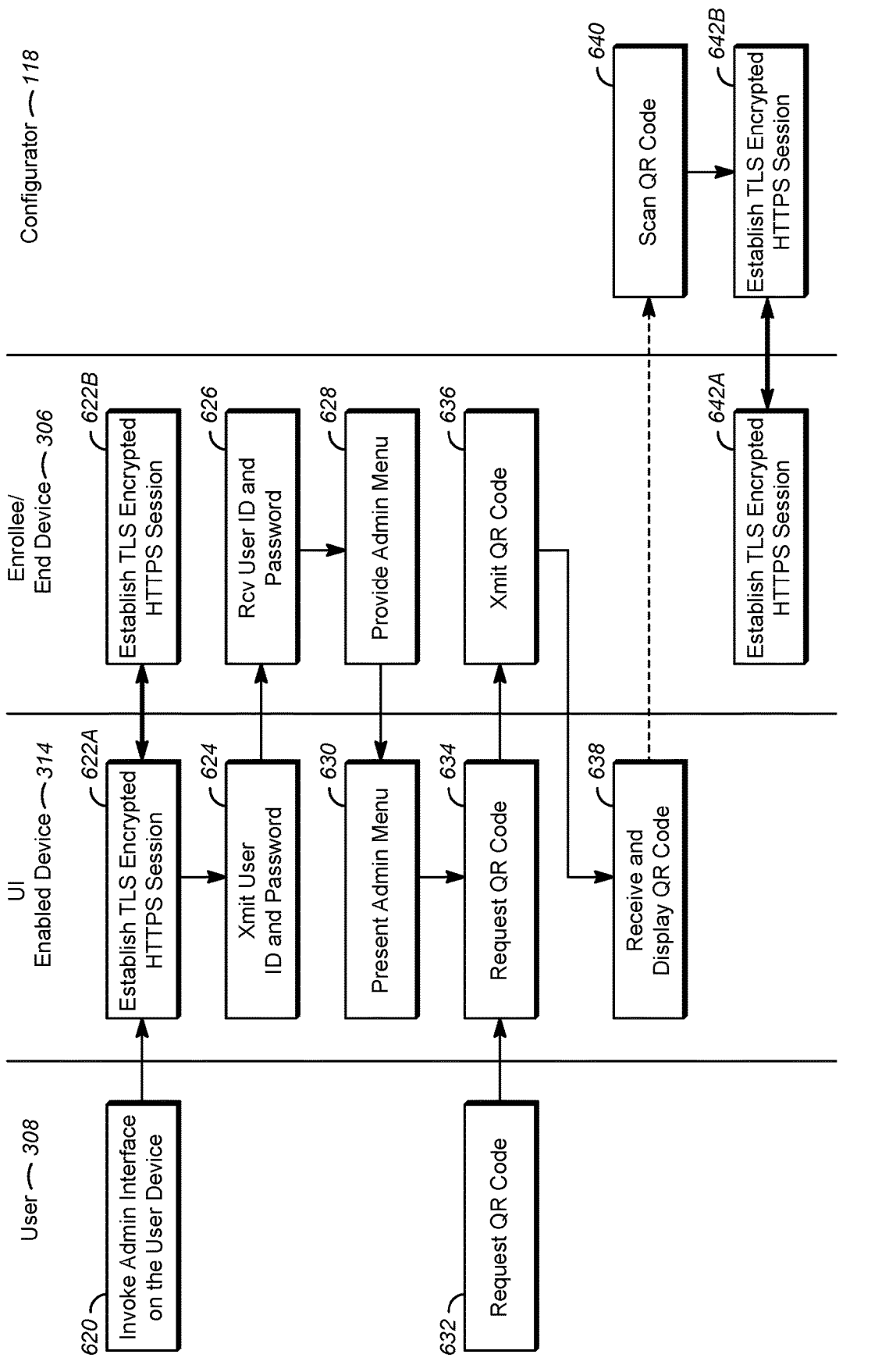

FIGS. 6A and 6B are diagrams illustrating an exemplary operations used in this embodiment. Referring to FIG. 6A, in block 602, the key generation facility 302 generates or imports a plurality of sets of credentials such as DPP credentials. Each set of credentials includes, for example, a public/private key pair (e.g. $K_{Pr}$ and associated $K_{Pu}$) and optional attributes that identify end devices 306. Such optional attributes include the media access control (MAC) address of the user devices 306 or the Wi-Fi channels used by the associated user devices 306. In block 604, the key generation facility 302 encrypts the private key of each set of credentials, for example, using an inner-key that may be pre-provisioned to the user device 306 for which the credentials are intended. Each set of credentials (with the associated encrypted private key) is provided to the secure online service 304 for storage, along with a list of device IDs (e.g., serial numbers) for which the each set of personalization data is intended to be provisioned, as shown in block 606. The secured credentials are then stored, as shown in block 607.

In block 608, the user device 306 sends a message to the secure online service 304 requesting DPP credentials. The message includes the user device ID, and in the illustrated embodiment, a signature of the user device 306 and a digital certificate chain obtained by the manufacturer of the user device 306. The secure online service receives the request, and after authenticating the request using the device signature and digital certificate chain, retrieves an unused set of stored credentials (which may be the next set on a list of unused credentials), as shown in block 610. This includes the private key $K_{Pr}$, associated public key $K_{Pu}$, and QR code data. As shown in block 612, the secure online service 304 then encrypts the private key $K_{Pr}$ and transmits the encrypted private key $E_{inner-key}[K_{Pr}]$ to the user device 306, as well as the public key $K_{Pu}$, the QR code data, and optionally, a digital certificate having the public key $K_{Pu}$. As described earlier with respect to FIGS. 5A and 5B, the private key $K_{Pr}$ is encrypted according to the inner key and may also be encrypted according to the DH session key (or key agreement encryption key KAEK). In block 616, the secure online service 304 transmits the message having the credentials to the user device 306, and in block 618, the user device 306 receives the message, decrypts the private key $K_{Pr}$, and saves the decrypted private key $K_{Pr}$, the public key $K_{Pu}$ and the QR code data, and the trusted DPP digital certificate having the public key $K_{Pu}$ in memory.

Turning to FIG. 6B, in block 620, the user 308 invokes an administrator interface (e.g. a WebGUI interface) on the user device 306. This is used to establish a TLS encrypted HTTPs session between the UI enabled device 314 and the user device 306, as shown in blocks 622A and 622B. This interface is secured with a user device digital certificate (e.g. a DPP X.509 certificate) previously received from the secure online service 304). The application running on the UI enabled device 314 typically trusts the user device 306 digital certificate because it is signed by a public certificate authority trusted by the OS of the UI enabled device 314 and/or the browser running on the UI enabled device 314. The UI enabled device 314 is used to transmit the user ID and password to the user device 306, as shown in blocks 624 and 626. The user device 306 then provides data to the UI enabled device 314 that when processed by the UI enabled device, presents administrator menu, as shown in blocks 628 and 630.

Through use of the presented admin menu, the user 308 requests a QR code, and the request is provided from the UI enabled device 314 to the user device 306, as shown in blocks 632-634. The user device 306 responds by transmitting the QR code data to the UI enabled device 314, as shown in block 636. The UI enabled device 314 accepts the QR code data, generates a visible QR code for display by the UI enabled device 314, as shown in block 638. The configurator 102 scans the presented visible QR code, as shown in block 640, and this information is used to establish a TLS encrypted HTTPS session between the configurator 102 and the user device 306, as shown in blocks 642A and 642B.

This embodiment is simpler to implement than the embodiment shown in FIGS. 5A and 5B, once the trusted DPP certificate has been provided and downloaded in the user device 306. However, issuing certificates from a public Certificate Authority is not always possible and may be costly. Also, pre-installing manufacturer-specific private certificates on the user devices 306 is inconvenient and may be problematic for unsophisticated users. If the administrator (WebGUI) interface is insecure (e.g. no TLS is established or is established with an untrusted certificate), the user's privacy and security of this solution may be compromised.

If the user 308 registers the user device 306 with the user registration portal 310 before the user device 306 is provisioned with credentials (e.g. before the operations of blocks 518 and 520 are performed), a user will not be able to obtain the QR Code during device registration. Once the credentials are provided to the user device 306, the secure online service 304 publishes the QR code data (and the user device 306 identifier) to the QR code directory 312. The operations then proceed as described in FIG. 5B starting with block 524.

Hardware Environment

Figure 7:
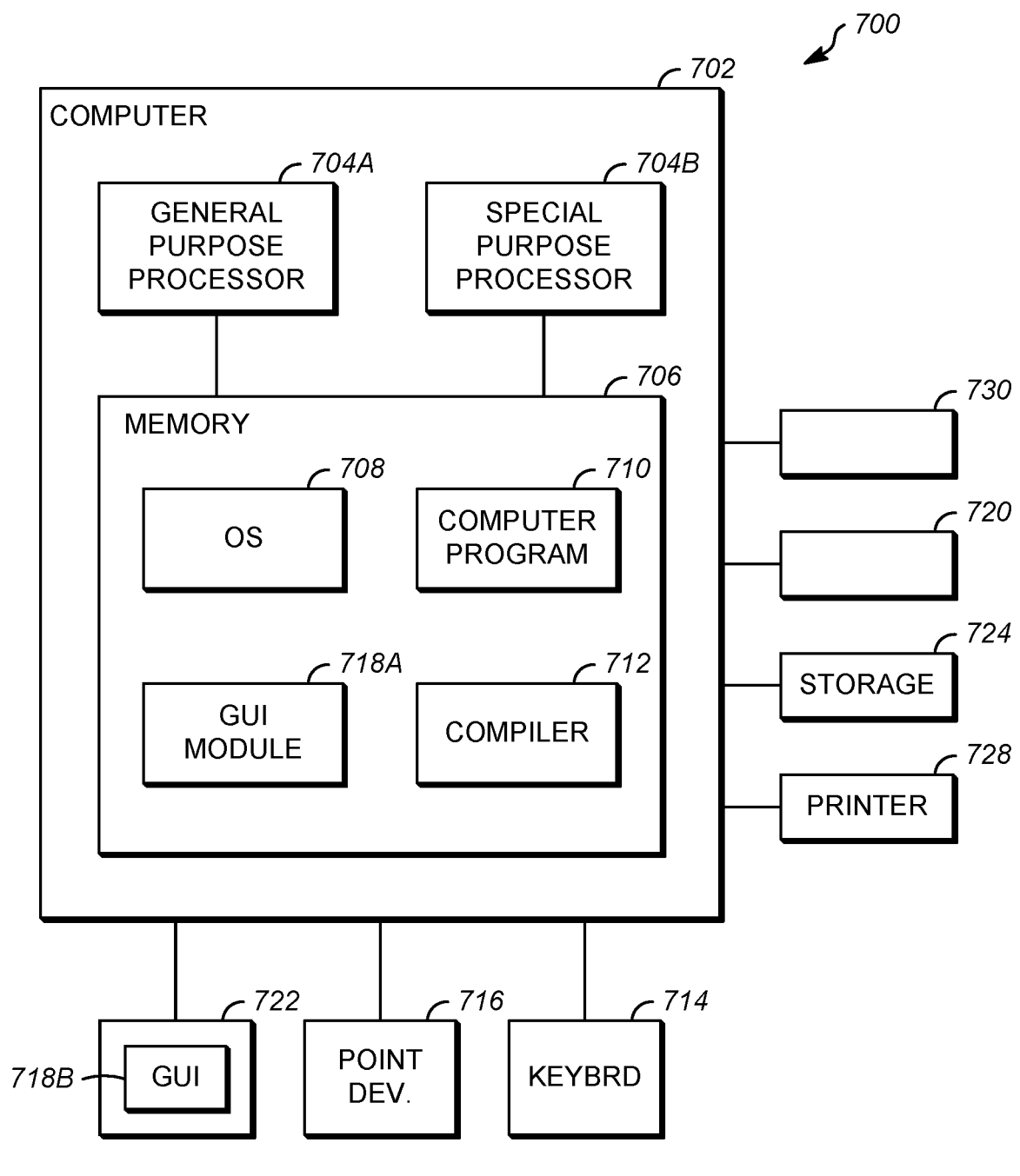
FIG. 7 illustrates an exemplary computer system that could be used to implement processing elements of the credential provisioning system.

FIG. 7 illustrates an exemplary computer system 700 that could be used to implement processing elements of the above disclosure, including the key generation facility 302, the secure online service 304, the user device 306, the UI enabled device 314, the configurator 102, and the QR code directory 312. The computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer 728, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One embodiment is evidenced by a method of authenticating a user device transmitting a request for credentials from the user device, where: the request may include a user device identifier; the credentials may include an asymmetric key pair having a public key and an associated private key, the private key being encrypted. The method also includes receiving the credentials in the user device, the credentials may include the encrypted private key and the public key; retrieving QR code data associated with the user device identifier from a QR code data directory, the QR code data generated from the public key and stored in the QR code data directory according to the user device identifier by a secure online service; extracting the public key from the QR code data; and establishing an authenticated and encrypted communication session with the user device according to the extracted public key.

Embodiments include corresponding computer systems, apparatus, and computer programs recorded on one or more computer storage devices, each configured to perform the actions of the methods. Implementations may include one or more of the following features.

The above method wherein: the public key and associated encrypted private key is one of a plurality public keys and associated encrypted private keys, generated by: generating, in an off-line system, a plurality of asymmetric key pairs, each asymmetric key pair having a generated public key and an associated generated private key; encrypting each private key of each symmetric key pair; and storing public keys and encrypted private key in the secure online service; and the encrypted private key and the public key is received from the secure online service in response to the request for personalization data.

Any of the above methods, wherein: user device identifier is provided to a secure online service as part of a request for credentials, and the QR code data is generated by the secure online service based on the public key and forwarded to the QR code directory along with the associated user device identifier for storage.

Any of the above methods, wherein: the private key is encrypted according to an inner key pre-provisioned to the user device; and the encrypted private key is decrypted according to the inner key and stored in the user device.

Any of the above methods, wherein: the QR code data is retrieved at least in part via a UI enabled device for displaying a QR code generated from the QR code data.

Any of the above methods, wherein: retrieving the QR code data associated with the user device identifier from the QR code data directory may include: accepting a request for the QR code data, the request may include the user device identifier; providing the QR code data to the UI enabled device; and scanning a QR code presented on the UI enabled device, the QR code generated from the QR code data.

Any of the above methods, wherein: the request for credentials further may include at least one of a media access control (mac) address of the user device or a wi-fi channel of the user device; and the request for the QR code data further may include the at least one of the mac address of the user device or the wi-fi channel of the user device.

Any of the above methods, wherein: in the QR code data generated by the secure online service is based on the public key and the at least one of the mac address of the user device and the wi-fi channel of the user device.

Any of the above methods, wherein: the request for the QR code data is accepted in a user registration portal and forwarded from the user registration portal to the QR code data directory; and the QR code data is provided by the QR code data directory to the UI enabled device via the user registration portal.

Any of the above methods, wherein: a communication path between the user device and secure online service is selected from a group may include: a mobile operator network; and a temporary wi-fi connection established by password-based authentication.

Any of the above methods, wherein: the user device identifier is inaccessible to prohibited users; retrieving the QR code data associated with the user device identifier from the QR code data directory may include: accepting the request for the QR code data from a configurator via an encrypted and authenticated communication session, the request for the QR code data including the user device identifier; and transmitting the QR code data from the QR code data directory to the configurator.

Implementations of the described techniques may include hardware, a method or process, or computer software on a computer-accessible medium.

Another embodiment is evidenced by an apparatus for authenticating a user device. The apparatus also includes a processor; and a memory, communicatively coupled to the processor, the memory storing processor instructions. The processor instructions include processor instructions for: transmitting a request for credentials from the user device, where: the request may include a user device identifier; the credentials may include an asymmetric key pair having a public key and an associated private key, the private key being encrypted. The processor instructions also include processor instructions for receiving the credentials in the user device, the credentials may include the encrypted private key and the public key; retrieving QR code data associated with the user device identifier from a QR code data directory, the QR code data generated from the public key and stored in the QR code data directory according to the user device identifier by a secure online service; extracting the public key from the QR code data; and establishing an authenticated and encrypted communication session with the user device according to the extracted public key.

Embodiments include corresponding computer systems, apparatus, and computer programs recorded on one or more computer storage devices, each configured to perform the actions of the methods. Implementations may include one or more of the following features.

The above apparatus wherein: the public key and associated encrypted private key is one of a plurality public keys and associated encrypted private keys, generated by: generating, in an off-line system, a plurality of asymmetric key pairs, each asymmetric key pair having a public key and an associated private key; encrypting each private key of each symmetric key pair; and storing public keys and encrypted private key in the secure online service; and the encrypted private key and the public key is received from the secure online service in response to the request for personalization data.

Any apparatus described above, wherein: the user device identifier is provided to a secure online service as part of a request for credentials, and the QR code data is generated by the secure online service based on the public key and forwarded to the QR code directory along with the associated user device identifier for storage.

Any apparatus described above, wherein: the private key is encrypted according to an inner key pre-provisioned to the user device; and the encrypted private key is decrypted according to the inner key and stored in the user device.

Any apparatus described above, wherein: the QR code data is retrieved at least in part via a UI enabled device for displaying a QR code generated from the QR code data.

Any apparatus described above, wherein: the processor instructions for retrieving the QR code data associated with the user device identifier from the QR code data directory may include processor instructions for: accepting a request for the QR code data, the request may include the user device identifier; providing the QR code data to the UI enabled device; and scanning a QR code presented on the UI enabled device, the QR code generated from the QR code data.

Any apparatus described above, wherein: the request for the QR code data is accepted in a user registration portal and forwarded from the user registration portal to the QR code data directory; and the QR code data is provided by the QR code data directory to the UI enabled device via the user registration portal.

Any apparatus described above, wherein: the user device identifier is inaccessible to prohibited users; the processor instructions for retrieving the QR code data associated with the user device identifier from the QR code data directory may include processor instructions for: accepting the request for the QR code data from a configurator via an encrypted and authenticated communication session, the request for the QR code data including the user device identifier; and transmitting the QR code data from the QR code data directory to the configurator.

Implementations of the described techniques may include hardware, a method or process, or computer software on a computer-accessible medium.

What is claimed is:

1. A method of authenticating a user device, comprising:
transmitting a request for credentials from the user device, wherein:
  the request comprises a user device identifier;
  the credentials comprise an asymmetric key pair having a public key and an associated private key, the private key being encrypted, where the private key is encrypted according to an inner key pre-provisioned to the user device and the encrypted private key is decrypted according to the inner key and stored in the user device;
receiving the credentials in the user device, the credentials comprising the encrypted private key and the public key;
retrieving quick response (QR) code data associated with the user device identifier from a QR code data directory, the QR code data generated from the public key and stored in the QR code data directory according to the user device identifier by a secure online service;
extracting the public key from the QR code data; and establishing an authenticated and encrypted communication session with the user device according to the extracted public key.

2. The method of claim 1, wherein:

the public key and associated encrypted private key is one of a plurality public keys and associated encrypted private keys, generated by:

generating, in an off-line system, a plurality of asymmetric key pairs, each asymmetric key pair having a generated public key and an associated generated private key;

encrypting each private key of each symmetric key pair; and storing public keys and encrypted private key in the secure online service; and the encrypted private key and the public key is received from the secure online service in response to the request for personalization data.

3. The method of claim 2, wherein:

the user device identifier is provided to the secure online service as part of a request for credentials, and the QR code data is generated by the secure online service based on the public key and forwarded to the QR code directory along with the associated user device identifier for storage.

4. The method of claim 2, wherein the QR code data is retrieved at least in part via a user interface (UI) enabled device for displaying a QR code generated from the QR code data.

5. The method of claim 4, wherein:

retrieving the QR code data associated with the user device identifier from the QR code data directory comprises:

accepting a request for the QR code data, the request comprising the user device identifier;

providing the QR code data to the UI enabled device; and scanning a QR code presented on the UI enabled device, the QR code generated from the QR code data.

6. The method of claim 5, wherein:

the request for credentials further comprises at least one of a media access control (MAC) address of the user device or a Wi-Fi channel of the user device; and the request for the QR code data further comprises the at least one of the MAC address of the user device or the Wi-Fi channel of the user device.

7. The method of claim 6, wherein the QR code data generated by the secure online service is based on the public key and the at least one of the MAC address of the user device and the Wi-Fi channel of the user device.

8. The method of claim 5, wherein:

the request for the QR code data is accepted in a user registration portal and forwarded from the user registration portal to the QR code data directory; and the QR code data is provided by the QR code data directory to the UI enabled device via the user registration portal.

9. The method of claim 4, wherein:

a communication path between the user device and the secure online service is selected from a group comprising:

a mobile operator network; and a temporary Wi-Fi connection established by password-based authentication.

10. The method of claim 2, wherein:

the user device identifier is inaccessible to prohibited users;

retrieving the QR code data associated with the user device identifier from the QR code data directory comprises:

accepting the request for the QR code data from a configurator via an encrypted and authenticated communication session, the request for the QR code data including the user device identifier; and transmitting the QR code data from the QR code directory to the configurator.

11. An apparatus for authenticating a user device, comprising a processor; and a memory, communicatively coupled to the processor, the memory storing processor instructions comprising processor instructions for:

transmitting a request for credentials from the user device, wherein:

the request comprises a user device identifier;

the credentials comprise an asymmetric key pair having a public key and an associated private key, the private key being encrypted, where the private key is encrypted according to an inner key pre-provisioned to the user device and the encrypted private key is decrypted according to the inner key and stored in the user device;

receiving the credentials in the user device, the credentials comprising the encrypted private key and the public key;

retrieving quick response (QR) code data associated with the user device identifier from a QR code data directory, the QR code data generated from the public key and stored in the QR code data directory according to the user device identifier by a secure online service;

extracting the public key from the QR code data; and establishing an authenticated and encrypted communication session with the user device according to the extracted public key.

12. The apparatus of claim 11, wherein:

the public key and associated encrypted private key is one of a plurality public keys and associated encrypted private keys, generated by:

generating, in an off-line system, a plurality of asymmetric key pairs, each asymmetric key pair having a public key and an associated private key;

encrypting each private key of each symmetric key pair; and storing public keys and encrypted private key in the secure online service; and the encrypted private key and the public key is received from the secure online service in response to the request for personalization data.

13. The apparatus of claim 12, wherein:

the user device identifier is provided to the secure online service as part of a request for credentials, and the QR code data is generated by the secure online service based on the public key and forwarded to the QR code directory along with the associated user device identifier for storage.

14. The apparatus of claim 11, wherein the QR code data is retrieved at least in part via a user interface (UI) enabled device for displaying a QR code generated from the QR code data.

15. The apparatus of claim 14, wherein:

the processor instructions for retrieving the QR code data associated with the user device identifier from the QR code data directory comprise processor instructions for:

accepting a request for the QR code data, the request comprising the user device identifier;

providing the QR code data to the UI enabled device; and scanning a QR code presented on the UI enabled device, the QR code generated from the QR code data.

16. The apparatus of claim 15, wherein:

the request for the QR code data is accepted in a user registration portal and forwarded from the user registration portal to the QR code data directory; and the QR code data is provided by the QR code data directory to the UI enabled device via the user registration portal.

17. The apparatus of claim 12, wherein:

the user device identifier is inaccessible to prohibited users;

the processor instructions for retrieving the QR code data associated with the user device identifier from the QR code data directory comprise processor instructions for:

accepting the request for the QR code data from a configurator via an encrypted and authenticated communication session, the request for the QR code data including the user device identifier; and transmitting the QR code data from the QR code data directory to the configurator.

\* \* \* \* \*